United States Patent
Kawai et al.

Patent Number: 6,109,099
Date of Patent: Aug. 29, 2000

[54] METHOD AND APPARATUS FOR DETECTING AIR PRESSURE IN A TIRE USING A BASIC WAVELET FUNCTION LOCALIZED IN TIME

[75] Inventors: Hiroaki Kawai; Katsu Hattori, both of Aichi-ken, Japan

[73] Assignee: Aisin Seiki Kabushiki Kaisha, Kariya, Japan

[21] Appl. No.: 09/217,626

[22] Filed: Dec. 22, 1998

[30] Foreign Application Priority Data

Dec. 22, 1997 [JP] Japan .................... 9-353415

[51] Int. Cl.$^7$ .................... B60C 23/02
[52] U.S. Cl. .................... 73/146.5
[58] Field of Search .................... 73/146.5, 146.4, 73/146.3; 340/442, 443, 444

[56] References Cited

FOREIGN PATENT DOCUMENTS

05133831  5/1993  Japan .
9-126932  5/1997  Japan .

*Primary Examiner*—William Oen
*Attorney, Agent, or Firm*—Sughrue, Mion, Zinn, Macpeak & Seas, PLLC

[57] ABSTRACT

The apparatus for detecting the air pressure of the tire includes an oscillating electric signal output section for outputting an oscillating electric signal including a vibration frequency component of a tire of a vehicle. A wavelet transformation section is provided for performing wavelet transformation of the oscillating electric signal outputted by the oscillating electric signal output section. A constant extraction section is provided for calculating mean values of the wavelet coefficients calculated by the wavelet transformation section at every predetermined interval of time, for obtaining an approximate curve of the second or greater order by a method of least squares using the mean values of the wavelet coefficients at the respective predetermined frequencies at every predetermined interval of time and for extracting a constant of the approximate curve. An air pressure estimating section is provided for estimating the air pressure of the tire based on the constant.

2 Claims, 6 Drawing Sheets

METHOD AND APPARATUS FOR DETECTING AIR PRESSURE IN A TIRE USING A BASIC WAVELET FUNCTION LOCALIZED IN TIME

BACKGROUND OF THE INVENTION

1. Field of the Invention

The present invention relates to a method and apparatus for detecting air pressure in a tire for a vehicle, and particularly to a method and apparatus for detecting air pressure in a tire using a wavelet function provided on the basis of a basic wavelet function localized in time.

2. Description of the Related Art

One type of apparatus for detecting an air pressure of a tire is proposed in Japanese Patent Unexamined Publication No. Hei. 9-126932. This apparatus has the object of continuously detecting the air pressure of a tire. It includes an oscillating electric, signal output means for outputting an oscillating electric signal which includes a vibration frequency component of a tire of a vehicle, wavelet transformation means for carrying out a wavelet transformation of the oscillating electric signal outputted from the oscillating electric signal output means using a basic wavelet function which is localized in time and expanded or contracted by a scale parameter in accordance with a shift parameter indicating a time position, and for calculating a wavelet coefficient by this wavelet transformation, resonant frequency extracting means for extracting a resonant frequency of a tire based on a mode of the wavelet coefficient calculated by the wavelet transformation means and air pressure estimating means for estimating the air pressure of a tire based on the resonant frequency extracted by the resonant frequency extracting means.

The wavelet coefficients of the wavelet transformation are obtained at a plurality of predetermined frequencies near the resonant frequency and from the modes of the wavelet coefficients. A maximum frequency is extracted for every predetermined interval of time and among these maximum frequencies, the maximum frequency the number of occurrences of which is largest in a definite period of time is extracted as the resonant frequency:

However, in the apparatus for detecting an air pressure of a tire proposed by the above publication since the resonant frequencies of tires are different for every tire (they are different if the type, maker or even the wheel cover is different), in the event that a tire is mounted which is different from the tires which were originally mounted on the new car, a shift occurs between the predetermined frequency for obtaining the wavelet coefficient by the wavelet transformation and the resonant frequency of the tire, with the result that there is a problem that the detection precision is lowered.

SUMMARY OF THE INVENTION

The present invention solves the problem mentioned above.

In the preferred embodiment of the present invention, a method for detecting the air pressure of a tire comprises the steps of: outputting an oscillating electric signal including a vibration frequency component of a tire of a vehicle, performing wavelet transformation of the oscillating electric signal at three or more predetermined frequencies through a basic wavelet function localized in time and expanded or contracted by a scale parameter in accordance with a shift parameter indicating a time position, calculating wavelet coefficients by the wavelet transformation, calculating a mean value of the wavelet coefficients at every predetermined interval of time, obtaining an approximate curve of the second or greater order by a method of least squares using the mean values said the wavelet coefficients at every predetermined interval of time, extracting a constant of the approximate curve; and estimating the air pressure of the tire based on the constant.

Figure 1:
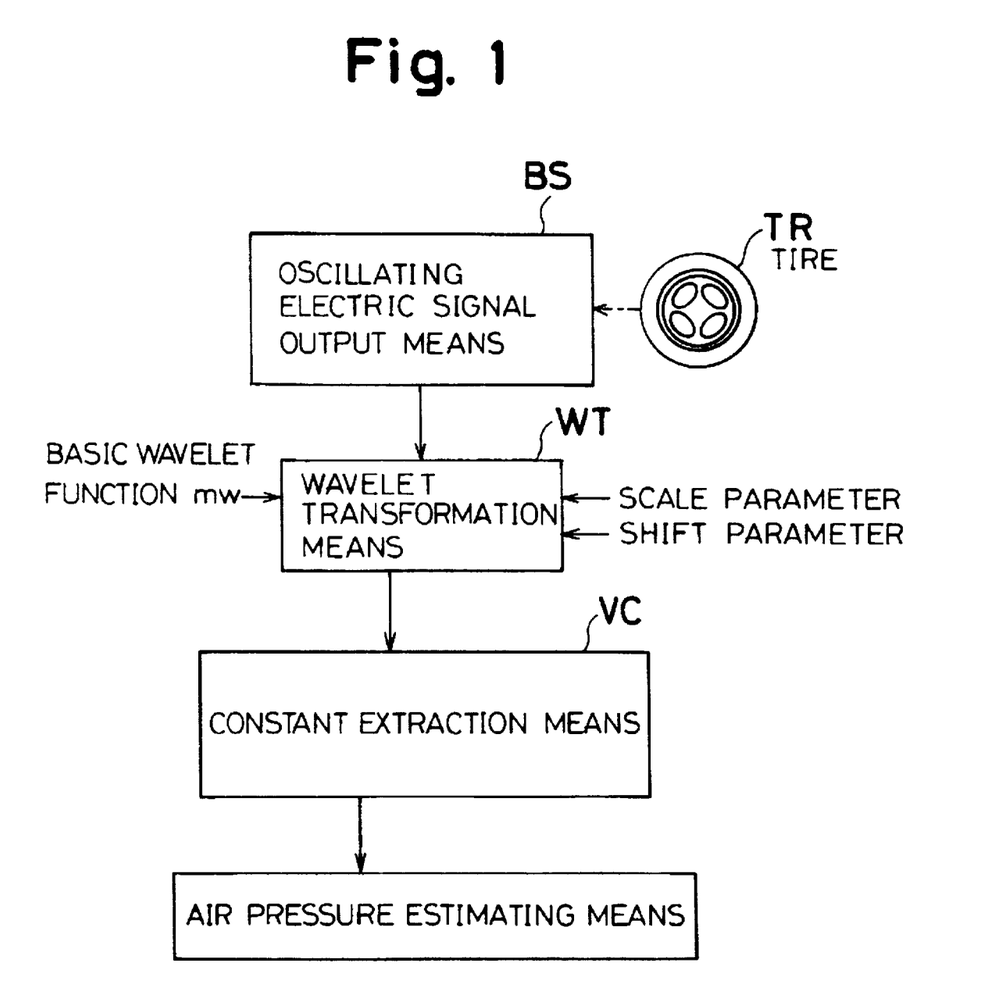
FIG. 1 is a block diagram schematically showing the structure of an apparatus for detecting an air pressure of a tire according to the present invention.

The present invention includes an apparatus for detecting an air pressure of a tire comprising oscillating electric signal output means BS for outputting an oscillating electric signal including a vibration frequency component of a tire TR of a vehicle, wavelet transformation means WT for performing wavelet transformation of the oscillating electric signal at three or more predetermined frequencies through a basic wavelet function MW localized in time and expanded or contracted by a scale parameter "a" in accordance with a shift parameter "b" indicating a time position, and for calculating wavelet coefficients F (a, b) through the wavelet transformation means WT, constant extraction means VC for calculating a mean value of the wavelet coefficients F (a, b) at every predetermined interval of time, for obtaining an approximate curve of at least the second order by a method of least squares using the mean values of said wavelet coefficients F (a, b) at the respective predetermined frequencies at every predetermined interval of time, and for extracting a constant of the approximate curve: and air pressure estimating means PE for estimating the air pressure of the tire based on the constant.

Figure 2:
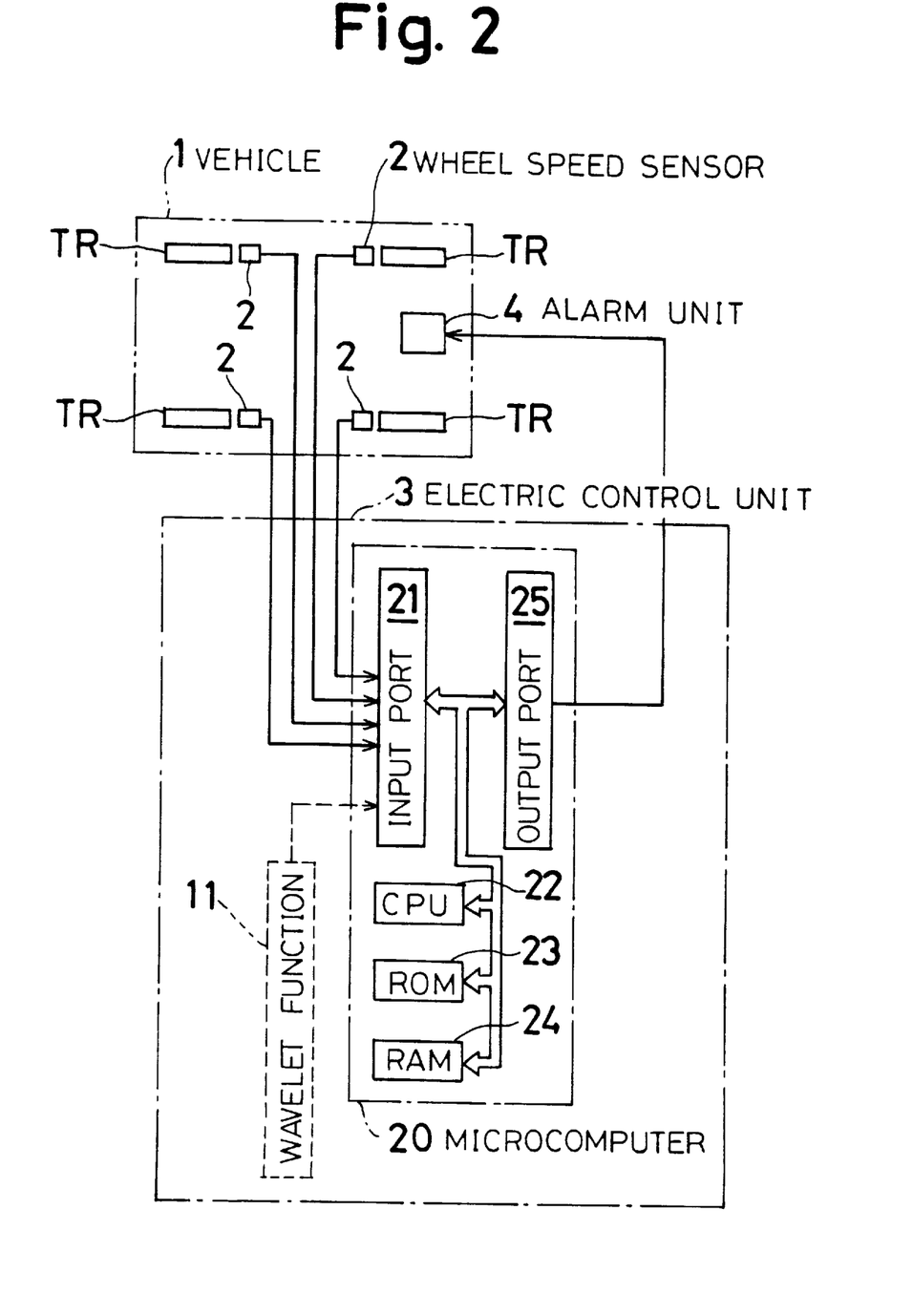
FIG. 2 is a schematic view showing the whole structure of an apparatus for detecting an air pressure of a tire according to the preferred embodiment of the present invention.
Figure 4:
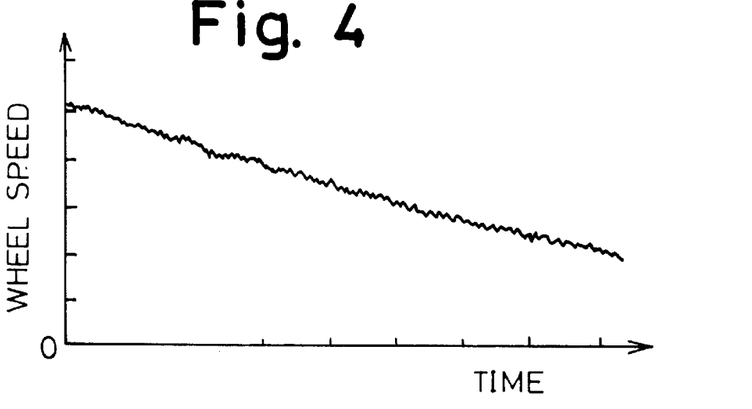
FIG. 4 is a graph showing an example of a changing state of vehicle speed.
Figure 5:
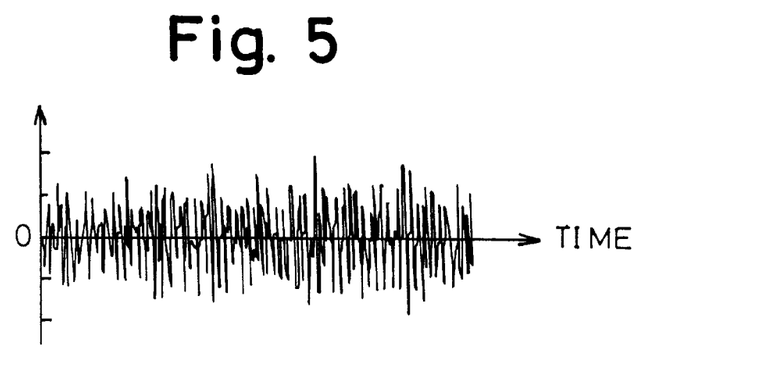
FIG. 5 is a graph showing an example of an oscillation state of vehicle speed.

DETAILED DESCRIPTION OF THE PREFERRED EMBODIMENTS n apparatus for detecting an air pressure of a tire according to the preferred-embodiment of the present invention will be described with reference to drawings. In FIG. 2, a wheel speed sensor 2 for detecting the rotation speed of a tire is associated with each of tires TR of a vehicle I. The wheel speed sensor 2 may be a well-known electromagnetic induction system sensor which is made of a toothed rotor which rotates with the rotation of the respective wheels and a pickup provided opposite the tooth portion of the rotor, and which is structured such that digital signals corresponding to the rotation speed of the respective wheels are outputted. However, another system may be used. FIG. 4 shows an example of changes of wheel speed, and when oscillating components are extracted, the state shown in FIG. 5 is obtained. Each of the respective wheel speed sensors 2 are connected to an electric control unit 3, the output signal of the wheel speed sensor 2 is supplied to a microcomputer and the microcomputer 20 determines whether the air pressure of the tire TR has been lowered. A warning unit 4 is operated (or not operated) according to the result of the determination.

The microcomputer 20 has a general structure including an input port 21, a CPU 22. a ROM 23, a RAM 24, an output port 25 and the like which are mutually connected through a common path. The microcomputer 20 is structured such that an output signal from the wheel speed sensor 2 is inputted through the input port 21, is processed by the CPU 22 and is outputted from the output port 25 to the warning unit 4. A wavelet function (for example, Gabor function) 11 is set for the microcomputer 20. In the microcomputer 20. the RON 23 stores a program corresponding to the flowchart shown in FIG. 3, the CPU 22 executes the program while a not-shown ignition switch is closed and the PAM 24 temporarily stores variation data necessary for execution of the program.

Here the definitions of a wavelet transformation as a prerequisite of the present invention and other terms used in this application will be clarified. First, a function which becomes a basis of the wavelet transformation is called a basic wavelet function h(t) which is a square integral function, a norm of which is normalized and which is localized at least in a time period. This basic wavelet function h(t) can be expressed on the assumption that the following equation 1, called an admissible condition, is established. This equation 1 expresses that a direct current component (mean value) of the signal is zero.

$$h(0)=(1/\sqrt{(2\pi)})\int h(t)dt=0 \qquad \text{[Equation 1]}$$

After the wavelet function is scaled "a" times as shown in the following equation 2, the origin is shifted by "b" so that the wavelet function is set.

$$ha,b(t)=(1/\sqrt{a})h((t-b)/a) \qquad \text{[Equation 2]}$$

When a function to be analyzed is f(t), the wavelet function is defined as shown by the following equation 3. In this equation, F(a, b) expresses a wavelet coefficient, < >expresses an inner product, and * expresses a complex conjugate.

$$F(a, b)=<ha.b(t)f(t)>=\int Jh\, a,b(t)f(t)dt \qquad \text{[Equation 3]}$$

A wavelet function used for analysis is called an analyzing wavelet (basic wavelet function) and various functions such as the Gabor function may be used as analyzing wavelets for this purpose. For example, the wavelet of Morlet is one type of Gabor function, expressed by the following equation 4 and is known as an analyzing wavelet suitable for analysis of a signal including a singular point at which a differential coefficient becomes discontinuous.

$$h(t)=\exp(-j\overline{\omega}_0 t)\exp(-t^2/2), \overline{\omega}_? =5 \sim 6 \qquad \text{[Equation 4]}$$

In the microcomputer 20, it is determined whether or not there has been any lowering of the air pressure of the tire TR and the result of this determination is outputted to the warning unit 4. The warning unit 4 is structured such that when the air pressure of the tire TR is determined to be lowered, a warning signal such as a lamp (not shown) is turned on. Alternatively, the decrease in air pressure may be signaled by display and/or sound.

Figure 3:
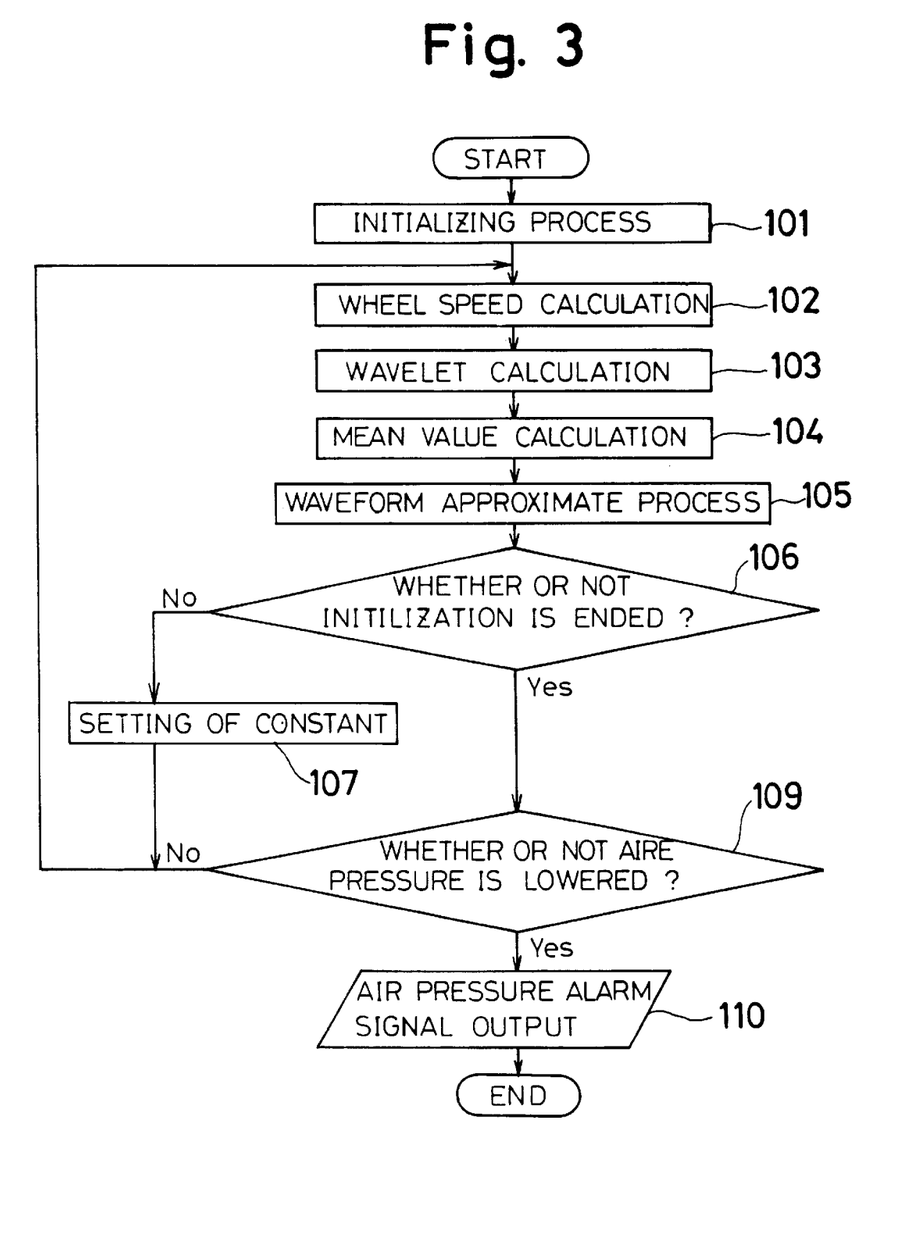
FIG. 3 is a flowchart showing a process of tire air pressure warning of the preferred embodiment of the present invention.

In the apparatus of this embodiment structured as described above, a series of processes relating to the detection of the air pressure of the tire TR are performed by the electric control unit 3. That is, when an ignition switch (not shown) is closed, execution of the program corresponding to the flowchart shown in FIG. 3 is begun and the program is repeated according to a predetermined cycle time (for example, 5 ms). First, at step 101, an initializing process of the microcomputer 20 is carried out so that various kinds of calculation values are cleared. Then, at step 102, wheel speed calculation is carried out on the basis of the output signal of the wheel speed sensor 2, which is used for estimation of the air pressure as an oscillating electric signal including an vibration frequency component of the tire TR.

Next, at step 103, the oscillating electric signal of the output of the wheel speed sensor 2 is inputted to the microcomputer 20, for example, as the foregoing function f(t) to be analyzed. Through the microcomputer 20, the wavelet transformation is carried out in accordance with a shift parameter "b" (hereinafter referred to as a time position (b)) to a scale parameter "a" (hereinafter referred to as a scale (a)) of frequency and the wavelet coefficient F(a, b) is calculated. That is, a convolution integral of the basic wavelet function to the function f(t) is carried out.

Figure 6:
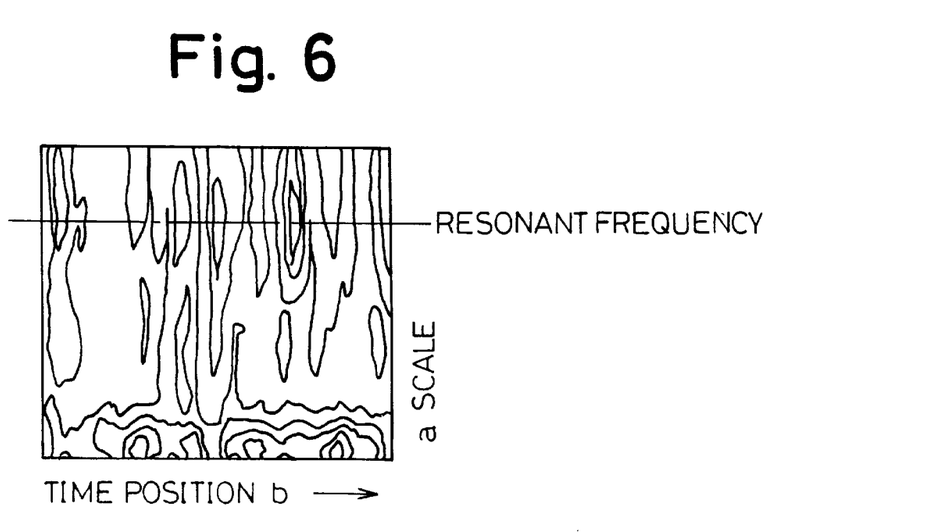
FIG. 6 is a graph showing an example of modes of wavelet coefficients used for extraction of a resonant frequency in the preferred embodiment of the present invention.
Figure 7:
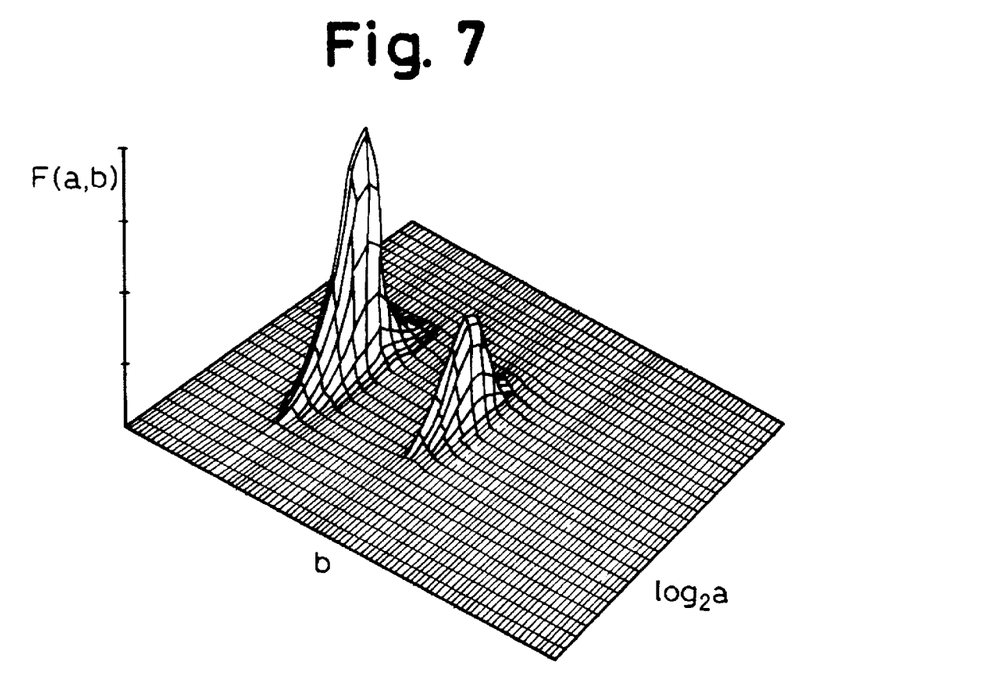
FIG. 7 is a graph three-dimensionally showing an example of wavelet coefficients.

FIG. 6 shows the mode of the wavelet coefficient F(a, b) by the wavelet analysis. The size of the wavelet coefficient F(a, b) is distinguished by oblique lines and dot density as shown in the drawing. When this is displayed three-dimensionally, it becomes such as is exemplified in FIG. 7 (although the scale parameter "a" is based on logarithmic indication in any drawing; FIG. 6 and FIG. 7 do not directly correspond to each other) As the wavelet function, such functions are available as, for example, the Gabor function. Mexican hat function, French function and the Haar function.

The wavelet calculation at step 103 is carried out at three predetermined frequencies near the resonant frequency, for example. 30 Hz, 40 Hz and 50 Hz and a wavelet coefficient for each of these frequencies, for example, a wavelet coefficient $F(a, b)_{30}$ at frequency 30 Hz, a wavelet coefficient $F(a, b)_{40}$ at frequency 40 Hz, and a wavelet coefficient $F(a, b)_{50}$ at frequency 50 Hz are obtained. The number of predetermined frequencies at which the wavelet calculation is carried out is not limited to three, but the wavelet calculation may also be carried out at four or more predetermined frequencies.

Next, at step 104, mean values $\overline{F(a,b)}_{30}$, $\overline{F(a,b)}_{40}$ and $\overline{F(a,b)}_{50}$ are calculated at every predetermined interval of time (for example, 20 sec) for each of the wavelet coefficients $F(a, b)_{30}$, $F(a. b)_{40}$ and $F(a. b)_{50}$ calculated at step 103.

Figure 8:
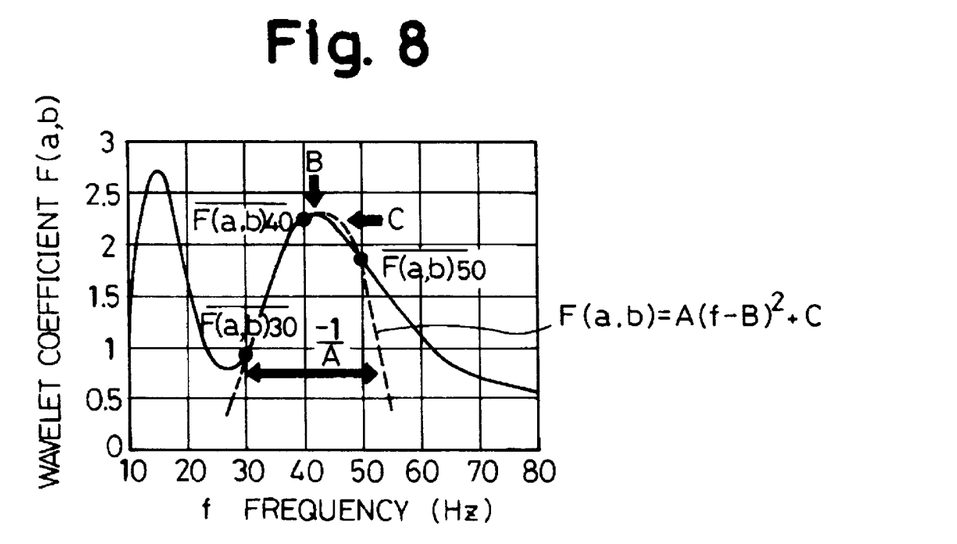
FIG. 8 is a graph showing a method of obtaining constants A, B, and C.
Figure 9:
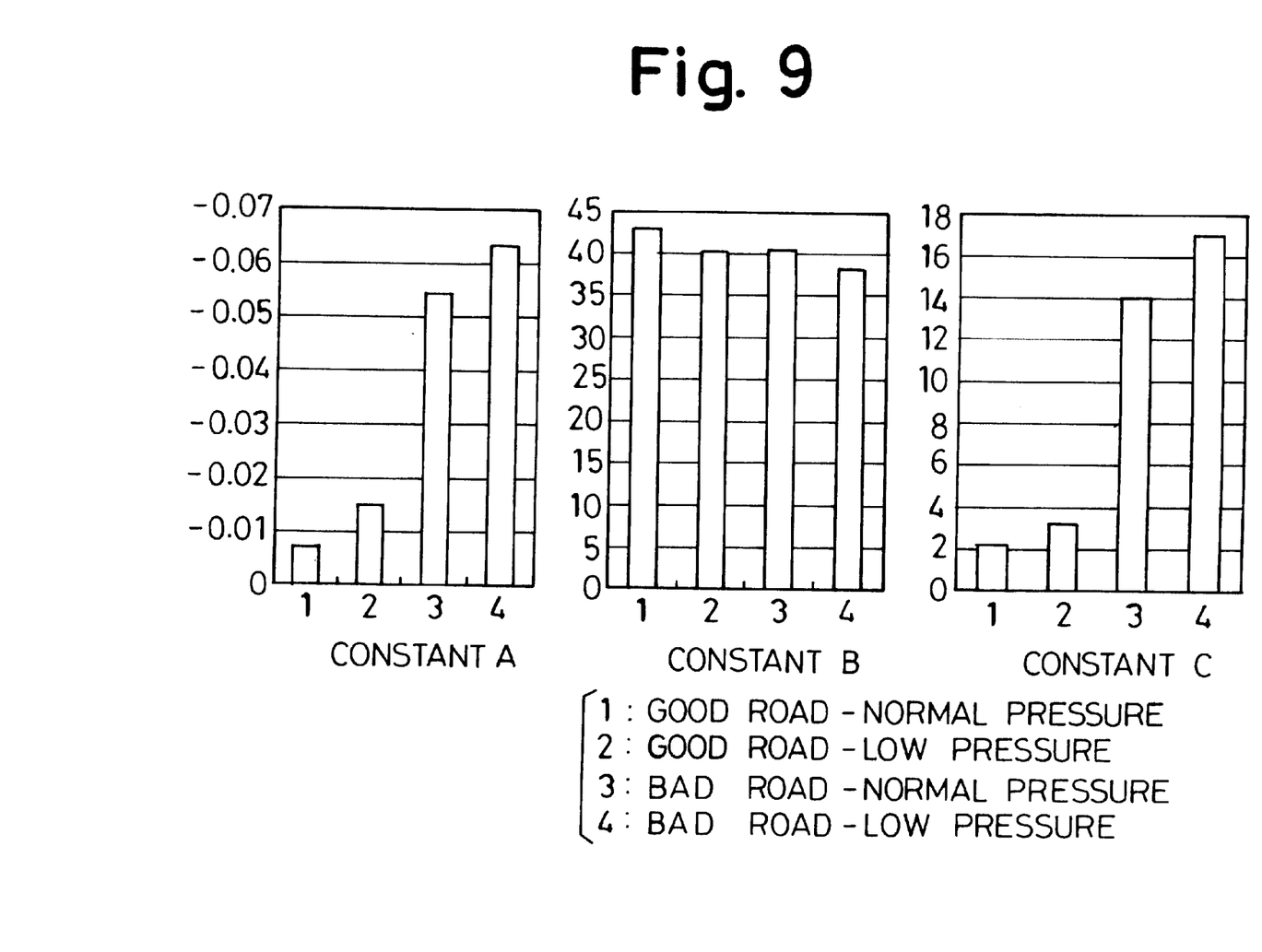
FIG. 9 is a graph showing relation between the constants A, B, and C. road surface quality and tire air pressure.

Next, at step 105, as shown in FIG. 8, a waveform approximation process for obtaining an approximate curve passing the wavelet coefficient mean values $\overline{F(a, b)}_{30}$, $\overline{F(a, b)}_{40}$ and $\overline{F(a, b)}_{50}$ is carried out. That is, by using the wavelet coefficient mean values $\overline{F(a, b)}_{30}$, $\overline{F(a, b)}_{40}$ and $\overline{F(a, b)}_{50}$, constants A, B, and C in the following equation 5 are calculated by a method of least squares.

$$F(a, b)=A(f-B)^2+C \qquad \text{[Equation 5]}$$

Where f denotes a frequency, constant C denotes a maximum value of the wavelet coefficient F(a, b), constant B denotes a frequency at the maximum value of the wavelet coefficient F(a, b) and the reciprocal of the constant A (−1/A) corresponds to a frequency width. FIG. 9 shows the relation between the constants A, B and C, the quality of a road surface and the air pressure of a tire.

Next, at step 106, it is determined whether or not the initialization is ended and if not, the process proceeds to step 107. After the constant B obtained by the method of least squares is initially set as the resonant frequency B, the process returns to step 102.

If, as a result of the determination at step 106, it is determined that the initialization is ended, the process proceeds to step 109, at which step it is determined whether or not the air pressure of the tire TR has decreased. More specifically, the resonant frequency B. obtained at step 105 is compared with the initial value of the resonant frequency B, set at step 107. When the resonant frequency B is less than or equal to the initial value of the resonant frequency B, obtained at step 107, minus a definite frequency which is a predetermined value(for example, 4 Hz, yielding ($B_0$−4 Hz) as the amount to which $B_0$, is compared), it is determined that the air pressure of the tire TR has decreased. If the air pressure of the tire TR is not determined to have decreased, the program returns to step 102 and the above process is repeated. However, if it is determined at step 109 that the air pressure has been lowered, the program proceeds to step 110, where an air pressure warning signal is outputted to the warning unit 4 and the warning unit 4 gives a visual and/or audible warning signal (for example, it turns on a lamp (not shown)).

As explained above at step 109, when the resonant frequency $B_{11}$ obtained at step 105 becomes less than or equal to the resonant frequency initially set at step 107 less a definite predetermined frequency value(for example 4 Hz), it is determined that the air pressure of the tire TR has decreased. However, the following modification may also be made, which constitutes the second preferred embodiment of the present invention.

In the second preferred embodiment of the present invention at step 107, the constants A and B obtained at step 105 are initially set as $A_0$ and $B_0$. When the resonant frequency $B_0$, obtained at step 105 is less than or equal to $B_0$, less a predetermined value at step 109 and when the constant $A_0$ obtained at step 105 is greater than or equal to the constant $A_0$ initially set at step 107 by a predetermined factor (for example, a factor of 1.5. or 1.5 times), it is determined that the air pressure of the tire TR has decreased.

Alternatively, another possible modification provides the third preferred embodiment of the present invention. According to this embodiment, when at step 107, the constant $A_0$ is initially set and when at step 109, the constant $A_0$ obtained at step 105 is greater than or equal to the constant $A_0$ initially set at step 107 by a predetermined value(for example, a factor of 2 or two times), it is determined that the air pressure of the tire TR has decreased.

A fourth preferred embodiment provides that at step 107 the constant $C_0$ is initially set and at step 109, when the constant $C_0$. obtained at step 105 is larger than the constant $C_0$ initially set at step 107 by a predetermined factor (for example, a factor of 2 or two times), it is determined that the air pressure of the tire TR has decreased.

Although a wavelet filter formed of an FIR (Finite Impulse Response) type filter is commonly used for the wavelet calculation at step 103 for the purpose of reducing the load to the microcomputer, an IIR (Infinite Impulse Response) type filter having the same impulse response or the same frequency response as the wavelet transformation may be used in combination with an FIR. With respect to the combination of the IIR type filter, for example, in the case where the Gabor function is used as a mother function, since it is divided into a real portion and an imaginary portion, it is necessary to obtain the calculation by $\sqrt{\{(\text{real portion})^2 + (\text{imaginary portion})^2\}}$. However, |real portion|+|imaginary portion|, max (|real portion| |imaginary portion|), Low Pass |real portion| or Low Pass |imaginary portion| may be used, which can further reduce the load to the microcomputer. Further, when the resonant frequency is obtained at step 105. although the constant B is used as it is, there are circumstances where it is hard to extract the resonant frequency by a method of least squares because of outer disturbances such as a road surface or tire irregularities. Thus, the constant B may be used as a resonant frequency if an absolute value of the constant A is higher than a predetermined value.

Since the present invention is structured as described above, the following effects can be obtained. That is, with respect to an electric signal including a vibration frequency component of a tire, the wavelet transformation is carried out as to three or more predetermined frequencies, the approximate curve of the second or greater order is obtained by the method of least squares using mean values of wavelet coefficients at the same respective predetermined frequencies at every predetermined interval of time, constants of the approximate curve are extracted and the air pressure of the tire is estimated based on the constants, so that even if a tire(s) is changed to a tire of a different type than that which was originally mounted on a new car, the air pressure of such different tire or tires can be accurately detected.

While the preferred embodiments have been described, variations thereto will occur to those skilled in the art within the scope of the present inventive concepts which are delineated by the following claims.

What is claimed is:

1. A method for detecting an air pressure of a tire comprising the steps of:

outputting an oscillating electric signal including a vibration frequency component of a tire of a vehicle;

performing wavelet transformation of the oscillating electric signal at three or more predetermined frequencies by a basic wavelet function localized in time and expanded or contracted by a scale parameter, in accordance with a shift parameter indicating a time position;

calculating wavelet coefficients through the wavelet transformation;

calculating a mean value of the wavelet coefficients at every predetermined interval of time;

obtaining an approximate curve of the second or greater order by a method of least squares using the mean values of the wavelet coefficients at the respective predetermined frequencies at every predetermined interval of time;

extracting a constant of the approximate curve; and estimating the air pressure of the tire based on the constant.

2. An apparatus for detecting an air pressure of a tire, comprising:

oscillating electric signal output means for outputting an oscillating electric signal including a vibration frequency component of a tire of a vehicle;

wavelet transformation means for performing wavelet transformation of the oscillating electric signal outputted by the oscillating electric signal output means at three or more predetermined frequencies through a basic wavelet function localized in time and expanded or contracted by a scale parameter, in accordance with a shift parameter indicating a time position, and for calculating wavelet coefficients by the wavelet transformation;

constant extraction means for calculating mean values of the wavelet coefficients calculated by the wavelet transformation means every predetermined time, for obtaining an approximate curve of the second or greater order by a method of least squares using the mean values of the wavelet coefficients at the respective predetermined frequencies every predetermined time, and for extracting a constant of the approximate curve; and air pressure estimating means for estimating the air pressure of the tire based on the constant.

* * * * *